United States Patent [19]

Antoniak

[11] 4,012,627
[45] Mar. 15, 1977

[54] DISTRIBUTION-FREE FILTER

[75] Inventor: Charles E. Antoniak, Berkeley, Calif.

[73] Assignee: The United States of America as represented by the Secretary of the Navy, Washington, D.C.

[22] Filed: Sept. 29, 1975

[21] Appl. No.: 617,886

[52] U.S. Cl. .......................... 235/152; 235/150.53; 343/5 DP; 343/100 CL
[51] Int. Cl.² ................. H03K 5/153; G06F 15/36
[58] Field of Search ............ 235/152, 156, 150.53; 343/5 DP, 100 CL

[56] References Cited

UNITED STATES PATENTS

| | | | |
|---|---|---|---|
| 3,614,626 | 10/1971 | Dillard | 343/5 DP X |
| 3,701,149 | 10/1972 | Patton et al. | 343/5 DP |
| 3,775,770 | 11/1973 | Dillard et al. | 343/100 CL |
| 3,925,646 | 12/1975 | Richardson et al. | 235/152 |

*Primary Examiner*—R. Stephen Dildine, Jr.
*Attorney, Agent, or Firm*—R. S. Sciascia; Charles D. B. Curry; Elliott N. Kramsky

[57] ABSTRACT

Data generally representative of presumed noise in an environment are collected and compared with data from one or more statistically symmetric observations of a selected portion of that environment. The data are ranked in order of magnitude and the rank order is stored in a shift register by associating one of two values to each datum according to its source. A plurality of register outputs are combined in summers to produce a representation of the rank order in terms of a complete orthogonal set of functions corresponding to the two-valued function stored in the register. A plurality of adjustable weight function multipliers are associated with the summers, their values having been determined according to statistical assumptions as to the nature of the underlying suspected signal and presumed noise. The outputs of the multipliers are summed and then are compared to a pre-determined threshold value, indicating the presence or absence of signal in the selected portion of the environment.

12 Claims, 3 Drawing Figures

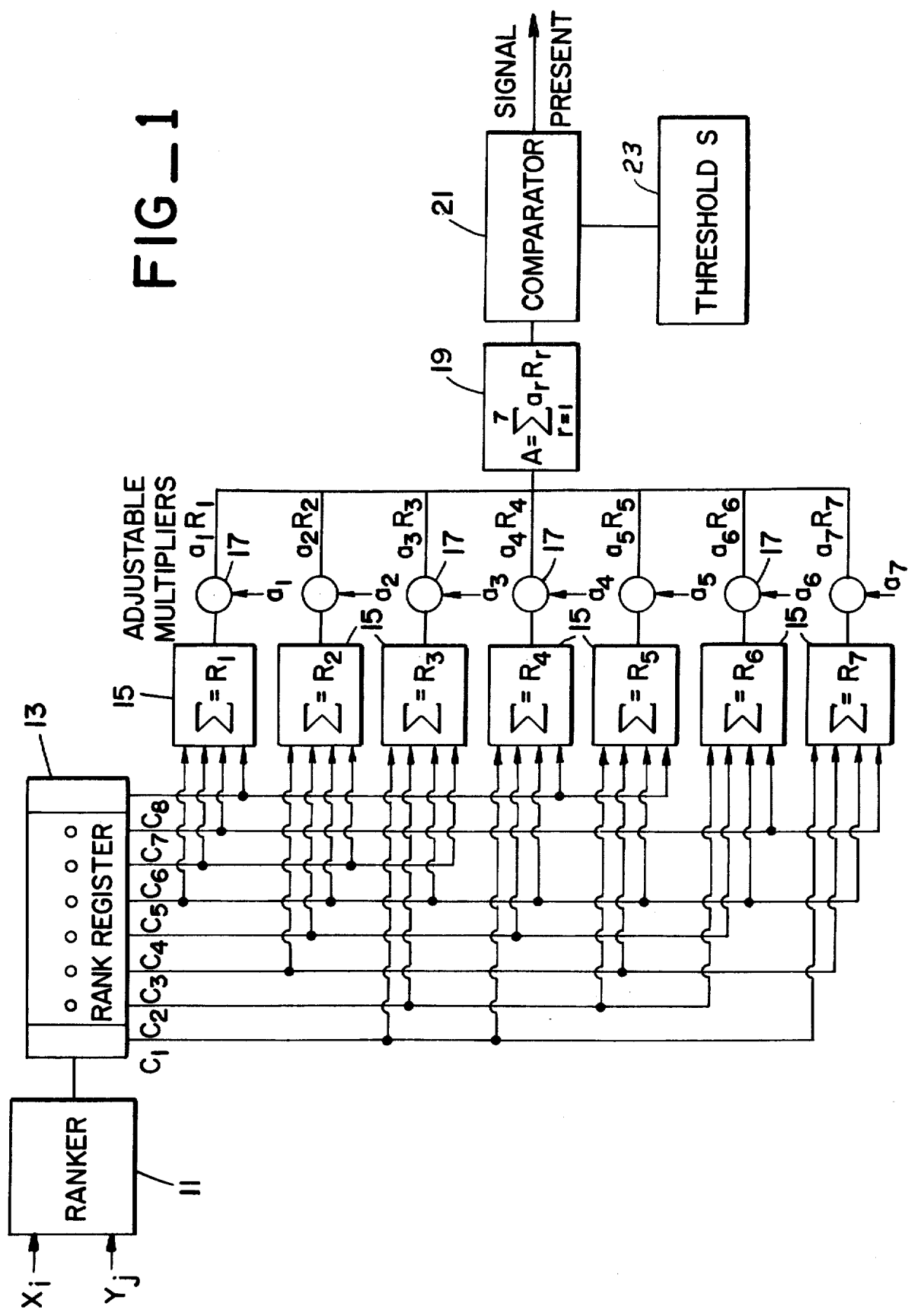

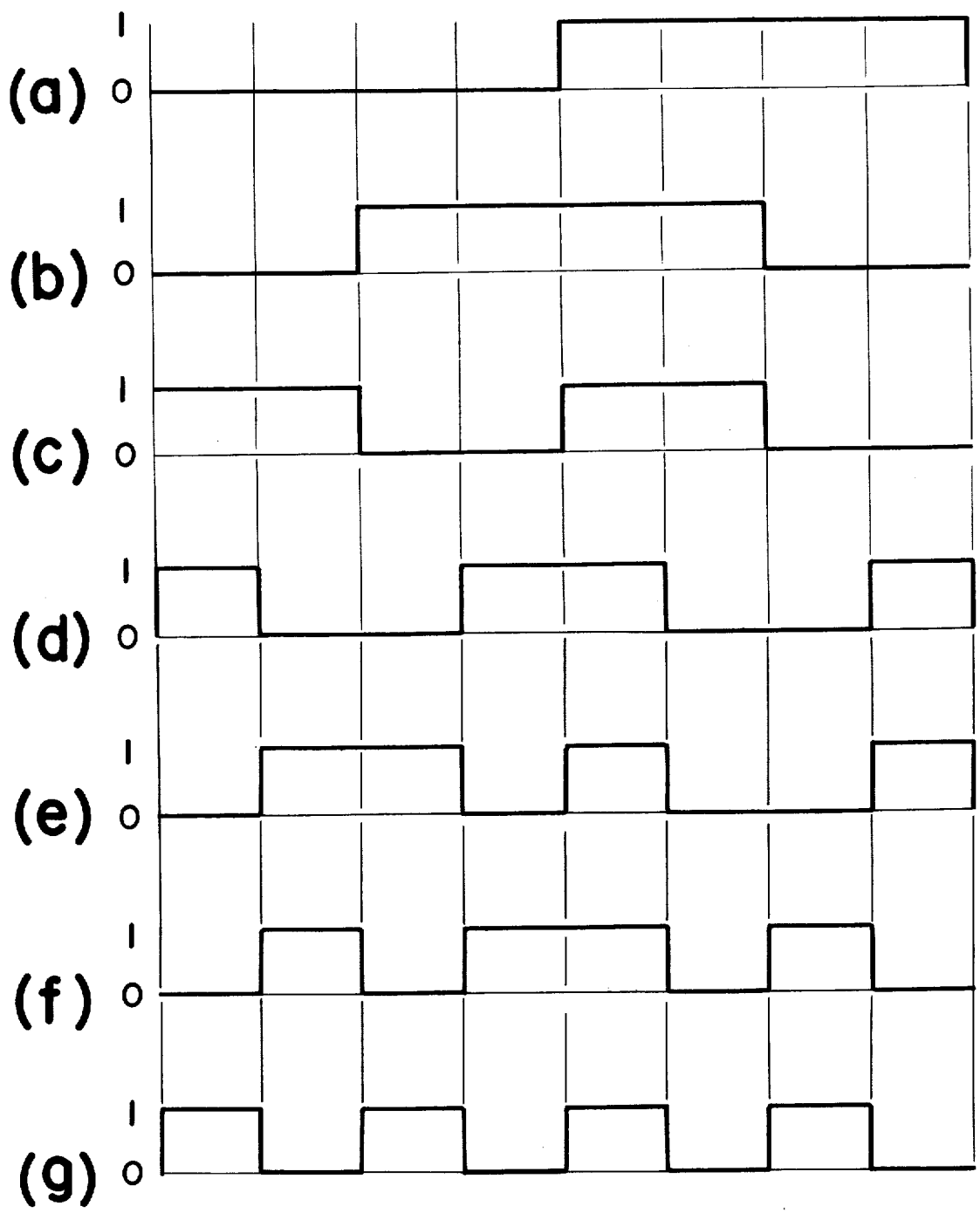
FIG_2

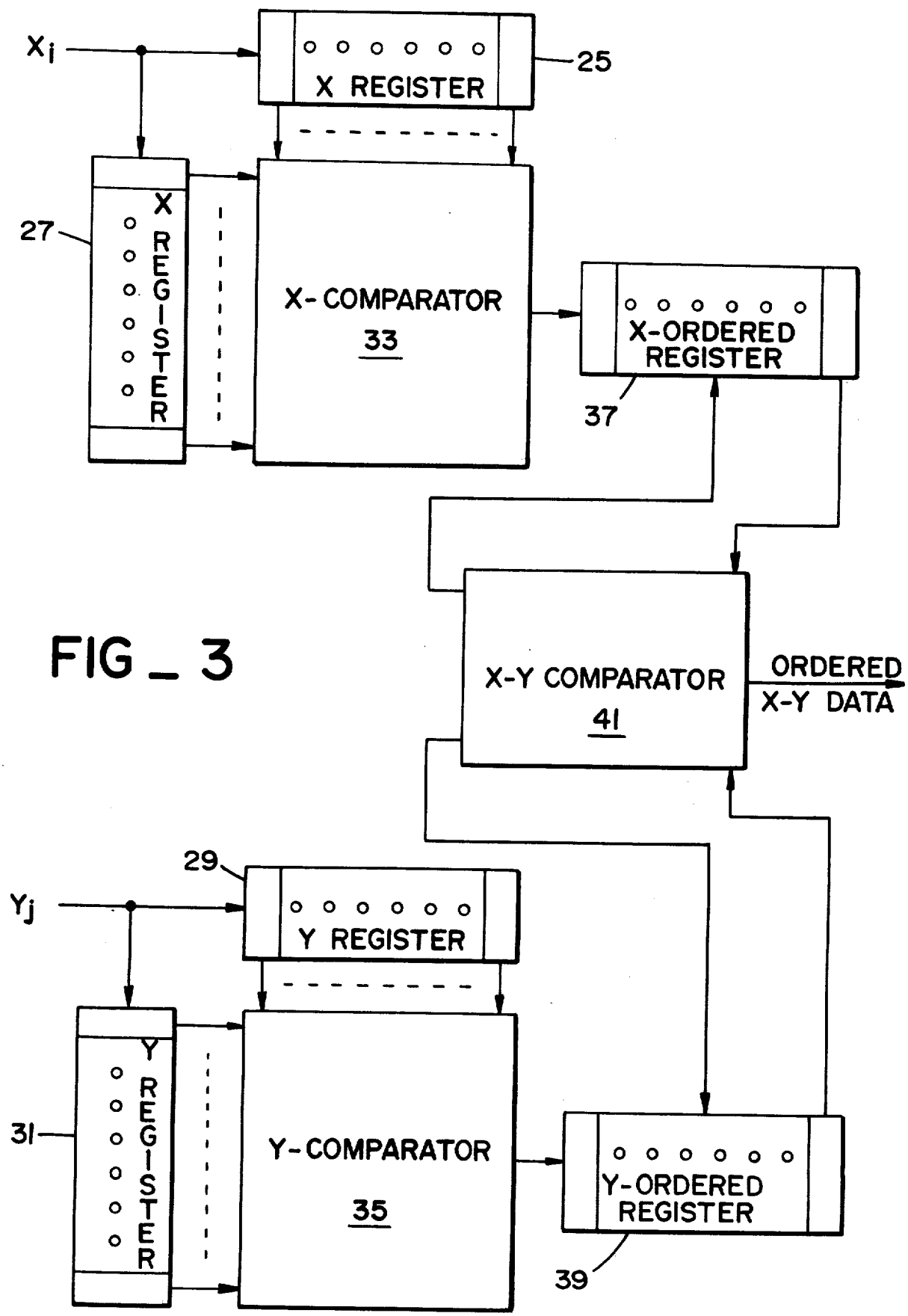
FIG_3

DISTRIBUTION-FREE FILTER

CROSS REFERENCE TO RELATED PATENT

The subject matter of the present invention, particularly as to its objective, is related generally to U.S. Pats. No. 3,614,626, titled "RADAR DETECTOR SYSTEM," filed Jan. 25, 1966, and issued Oct. 19, 1971, in the name of George M. Dillard, and U.S. Pat. No. 3,775,770, titled "METHOD AND MEANS FOR PERFORMING DISTRIBUTION-FREE DETECTION OF SIGNALS IN NOISE," filed Mar. 31, 1972, and issued Nov. 27, 1973, in the names of George M. Dillard and Charles E. Antoniak, the inventor of the invention disclosed and claimed herein.

BACKGROUND OF THE INVENTION

1. Field of the Invention

The preset invention relates to signal detection. In particular it relates to a means and method of filtering and analyzing input data using distribution-free statistical analysis.

2. Description of the Prior Art

A common problem in signal detection is the design of physical detectors whose operation will no be substantially impaired by the "false alarm" rate of the detector. Attempts to rectify and minimize the problems have often entailed the design of constant false alarm rate (CFAR) systems.

CFAR systems have been devised in which an estimated average noise level was used to control the detection threshold (or the quantization level in the case of binary integration). However, such threshold adjustment can result in a decrease in the probability of detection, another important system parameter. Furthermore, such methods achieve CFAR only in an average sense due to errors associated with the estimation of noise level.

CFAR may be accomplished by distribution-free (DF) procedures. A DF detector achieves CFAR by having constant false alarm probability on each and every detection test. Such a procedure allows the maintenance of CFAR even if drastic and unknown changes in the underlying distributions should occur, such as those caused by the employment of counter-measures.

The Dillard patent previously referred to employs a distribution-free criterion but is limited to implementation of but one distribution-free statistical test, namely Mann-Whitney-Wilcoxon. It may not readily accommodate a situation where the type, amplitude, or other characteristics of the noise environment may change.

The patent to Dillard and Antoniak referred to accomplishes distribution-free detection by comparing the return data at a given range with multiple-delayed statistically independent data generated by the return of a pulse in the desired direction. An underlying assumption of such a method is that all other ranges in the chosen azimuth consist wholly of noise and no signal. Also, it relies upon one azimuth location for all signals generated and performs only one statistical test.

The present invention achieves a constant false alarm rate by means of distribution-free detection involving multiple statistical test capability. It compares and ranks contemporaneously generated environmental noise at any azimuth with the signal to be analyzed, and using orthogonal function decomposition the ranked data are weighted by one or more statistical tests, summed and compared with an appropriate detection threshold.

SUMMARY OF THE INVENTION

The present invention basically includes a means and process to analyze possible signal data in light of presumed noise data by use of distribution-free statistics. Data generally representative of presumed noise in an environment are collected and compared with data from one or more statistically symmetric observations of a selected portion of that environment. The data are ranked in order of magnitude, then the rank order is stored in a shift register which preserves the data's identity by associating one of two values to each datum according to its source. A plurality of parallel register outputs are combined in summers to produce a representation of the rank order in terms of a complete orthogonal set of functions corresponding to the two-valued function stored in the register. A plurality of adjustable weight function multipliers are associated with the summers, their values having been determined according to statistical assumptions as to the nature of the underlying suspected signal and presumed noise. The outputs of the multipliers are summed and then are compared to a pre-determined threshold value, indicating the presence or absence of signal in the selected portion of the environment.

OBJECTS OF THE INVENTION

An object of this invention is to provide a method and means of signal detection using current data to achieve a constant false alarm rate.

A further object of this invention is to provide a method and means of distribution-free signal detection.

Yet another object of this invention is to provide a method and means to achieve optimal signal detection while achieving the above objects by providing a multiple statistical test capability.

Still another object of the present invention is to achieve the above objects by employing means which, in light of statistical theory, are capable of simplified construction.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic view of the present invention.

FIG. 2 represents the complete set of Walsh Function components of an eight component, two-discrete-valued function.

FIG. 3 is a schematic view of a ranker suitable for operation in the present invention.

DESCRIPTION OF THE PREFERRED EMBODIMENT

Referring now to FIG. 1, there is shown a schematic representation of the invention. The data represented as $X_i$ consists of observations of an area in which the inquiry as to presence of signal is to be made taken in any manner which assures that all possible orderings of the magnitudes are equally likely when noise alone is present. This property of the observations is technically described by saying they are symmetrically distributed and this term will be used herein to describe this property. The common method of achieving this result is by sampling so that the $X_i$ values are statistically independent. The data of a particular sector X may have been gathered from a resolution element representative of a particular range bin (data taken from some specific ranges or distances in space), for example. Statistical independence of the $X_i$ denotes a fact that the probability of the compound event $(X_1, X_2, X_3)$ equals the probability of $X_1$ times the probability of $X_2$ times the probability of $X_3$. This example may be extended indefinitely. To assure such statistical independence of the data $X_i$ when the $X_i$ are representative of successive pulse observations of a range bin, for instance, proper timing of the outgoing pulses will be required. The successful achievement of such timing is well known by those skilled in the art.

The data $Y_j$ are representative of environmental noise and will change as the character of such noise changes. Such data may be gathered, for example, either from the innermost ranges where one can observe the absence of targets or from the outermost ranges where a target, if present, will change the signal noise level only insignificantly. As false alarm rate refers to the situation where there is not signal present in the "presumed noise" (Y) sample or the "possible signal" (X) sample when both are noise, it is important that this noise have the same statistical properties for each. Thus, the "reference" or "comparative" sample should be gathered from a set of nearby resolution elements providing the same noise or clutter distribution. The independence of the X and Y samples is not crucial, only that they be symmetrically distributed.

The data $X_i$ and $Y_j$ are input to ranker 11. The design of a ranker appropriate for operation of the present system will be described in detail in reference to FIG. 3. In terms of its system function, the ranker is adapted to receive both possible signal data $X_i$ and presumed noise data $Y_j$, rank the data in order of magnitude, and provide an input $C_p$ to rank register 13 in order of magnitude which identifies the source of the input (i.e., an $X_i$ or a $Y_j$). Rank register 13 as illustrated is of the push down type in which data $C_1$ through $C_8$ is output in a parallel fashion. Data $C_1$ through $C_8$ represent an eight part two-valued series, each part corresponding to the location, in terms of relative magnitude, or either an $X_i$ (one value) or $Y_j$ (other value). It is to be understood that a serial output arrangement could be devised for equivalent operation.

The outputs of rank register 13 are summed in a plurality of summers 15. In the illustrated embodiment, the outputs of the register 13 are combined in summers 15 according to the Walsh spectral decomposition of the distribution 1's and 0's, for instance, in rank register 13.

It can be shown that there exists a complete set of orthogonal functions called Walsh functions representing any series of 1's and 0's or, for that matter, any series of two discrete values. The outputs of the rank register 13 have been summed in summers 15 in a combination which represents the seven Walsh functions that correspond to any combination of eight two-valued components. FIG. 2, a through g, illustrates the seven Walsh functions which comprise the complete Walsh orthogonal set for an eight member series of two discrete values. The summers 15 of FIG. 1 are wired to the eight outputs of rank register 13 in conformance with the Walsh functions of FIG. 2. The theory is not limited to combinations of eight but may be extended indefinitely according to the theory as explained in J. E. Walsh, "A Closed Set of Normal Orthogonal Function," Am. J. Math, Vol. 55, pp. 5 - 24 (1923). The components $R_r$ of the Walsh decomposition are weighted by a plurality of multiples $a_r$ or $a_1$ through $a_7$, each associated with its appropriate Walsh summer. Each $a_r$ represents a weight derived from statistical assumptions as to the nature of the signal plus noise. These weights are related to the properties of the statistical distribution assumed the most representative, and are derived from the score functions used in such tests as the Van der Waerden, Fisher-Yates, Terry-Hoeffding, Seigal-Tukey, median test and sign test. The concept behind selection of such values is set forth in Hajek and Sidak, "The Theory of Rank Tests" (Academic Press, 1967). An advantage of this invention is that for many cases of interest half or more of the $a_r$ may be zero, so in effect the corresponding Walsh filter may be dropped from the design. Conversely, if all the Walsh filters are kept, the fact that they are a mathematically complete set means that by proper choice of $a_r$ any conceivable linear rank detector can be implemented. In general, the $a_r$ will be zero which correspond to a symmetrical Walsh function and anti-symmetric score function. For the illustrated embodiment $a_2$, $a_4$, and $a_6$ would be equal to zero. Adjustable multipliers 17 allow the variation of $a_r$ values for optimal statistical testing.

The outputs of multipliers 17 are summed in summing means 19 to produce a value which is compared in comparator 21 with a threshold value S 23 to indicate the presence or absence of signal.

The sum produced by summing means 19 represents, then, a score weighted ranked statistical value of the mix of pure noise and possible signal plus noise. By being able to choose the weights given to the components of the Walsh decomposition, or any other complete decomposition, the present invention can implement any linear tank test detection procedure, including, but not limited to, normal scores tests such as the Van der Waerden, Fisher-Yates, and Terry-Hoeffding, as well as, Siegal-Tukey, the median test and sign test. Each of the above mentioned detectors is optimal for a particular class of signal plus noise distribution. Having the ability to choose which of these tests (detectors) will be implemented means that one has the potential of performing the most powerful test among all distribution-free tests based on ranks, and therefore having the highest probability of signal detection possible for detectors that use only the rank order information for signal decisions.

It can be shown mathematically, as is well known to statisticians, that detection tests which are based only on rank order of the data are distribution-free for any kind of distribution where ranking can be done unambiguously, i.e., where the probability of two observations having exactly the same value, say voltage level, is essentially zero. A principle feature of Walsh functions is the mathematically important property of completeness. Conceptually, any complete orthogonal set could be used.

There is illustrated in detail in FIG. 3 a device capable of performing the function of ranker 11. The presence of a ranker in the system, as illustrated in FIG. 1, is critical to the operation and theory of the invention, although other rankers equivalent in function and result to that of FIG. 3 may be devised to successfully implement the system of FIG. 1.

Possible signal data $X_i$ and noise data $Y_j$ are stored respectively in X registers 25 and 27 and in Y registers 29 and 31. All four of the registers are preferably of the destructible-memory type.

Identical X date is entered in both X registers 25 and 27 and, similarly, identical Y data is entered into both Y registers. Data stored in the X registers is input into a matrix-type X comparator 33. The X comparator is designed to successively choose the largest $X_i$ remaining in the X registers by searching for that value of $X_i$ in one X register which yields a non-negative difference when measured against all remaining $X_i$ in the other shift register. The register inputs cooperate with the comparator in a vector and transposed vector relationship forming a comparison matrix. Other scanning techniques are known in the art and may be successfully employed in the embodiment of the present invention to achieve the purposes necessary for its successful practice. Values $X_i$ are successively shifted out of the X registers through X comparator 33 into X-ordered register 37 in order of decreasing magnitude. Thus the values of $X_i$ are stored in order of magnitude in X-ordered register 37. A similar transformation of the ordering of the noise data $Y_j$ is accomplished by means of Y registers 29 and 31 and Y comparator 35 to achieve an ordering by magnitude of the noise data in Y-ordered register 39. Equal length of X and Y registers is neither necessary for the successful practice of the present invention or is it dictated by the mathematical theory underlying it.

The X-ordered register 37 and Y-ordered register 39 input into X–Y comparator 41. X–Y comparator 41 makes successive comparisons of the highest value in X-ordered register 37 with the highest value in Y-ordered shift register 39, each of which has a destructible type storage. If the highest value in the X-ordered register, for example, is greater than the highest value in the Y-ordered, Y–Y comparator 41 inputs a 1 into rank shift register 13 of FIG. 1 and sends a reset signal to the X-ordered shift register 37, emptying the register of the particular $X_i$ and calling up the next $X_i$ for comparison with the $Y_j$, which remains in Y-ordered shift register 39. If the $Y_j$ should exceed the $X_i$ against which it is being compared in X-Y comparator 41, the comparator will cause a 0 to be entered into rank register 13 of FIG. 1. By this procedure it may readily be seen that there will result in rank registers 13 an ordering of 1's and 0's corresponding to the rank in magnitude of the X's among the Y's as required for the operation of the detector already described.

Thus it is seen that a detection means has been achieved which accomplishes distribution-free detection of signals in an environment including noise and possesses the ability to test for signal using a multiplicity of statistical tests, assuring optimal detection and constant false alarm rate.

What is claimed is:

1. A system for detecting signals in a variable environment including noise which comprises:
   a. first means for receiving data representative of multiple observations of a pre-selected portion of said environment;
   b. second means for receiving data representative of presumed noise in said environment;
   c. ranking means having an input and an output to arrange said data in order of magnitude, then to produce sequentially at said output a series of signal, each signal having one of two discrete values, said values selected to indicate the source of said ranked datum;
   d. a register having an input and an output, said input adapted to receive said series of signals from said ranking means;
   e. a plurality of summing means, each of said summing means having a plurality of inputs and an output, the inputs of each of said summing means connected to the output of said register so that a complete orthogonal representation of the two-valued function stored in the register is achieved;
   f. a plurality of multipliers, each of said multipliers having an input and an output, said input connected to the output of one of said summing means, to multiply the output of said summing means by a pre-selected factor determined by the probable signal plus noise distribution;
   g. a main summer having at least one input terminal and an output terminal, said at least one input terminal being connected to the output of a multiplier;
   h. means for comparing the output of said main summer to a predetermined threshold value, whereby the presence or absence of signal in the input data corresponding to said pre-selected portion of the environment may be determined by said comparison.

2. A system as described in claim 1 wherein each of said multipliers is adjustable, the values of said plurality of multipliers capable of being varied in accordance with a plurality of statistical tests.

3. A system as described in claim 2 wherein said input data is derived from a sensor system and said threshold is selected in accordance with said plurality of statistical tests.

4. A system as described in claim 3 wherein said statistical tests are selected in accordance with said input data.

5. A system as described in claim 4 wherein said ranking means comprises:
   a. two possible signal registers, each having an input and an output, said input adapted to identically receive and said registers to store a succession of sensor returns from a selected portion of said enviroment;
   b. two noise registers, each having an input and an output, said inputs adapted to identically receive and said registers to store noise data representative of said environment;
   c. a matrix-type possible signal comparator having an input joined to the outputs of said possible signal registers and an output, said input adapted to receive said data stored in said possible signal registers and successively output the values of said possible signal data in order of decreasing magnitude;
   d. a matrix-type presumed noise comparator having an input joined to the outputs of said noise registers and an output, said input adapted to receive the data stored in said noise registers and successively output the values of said noise data in order of decreasing magnitude;
   e. a first ordered register having an input and an output, said input adapted to receive said succession of data from the output of said possible signal comparator and to store said data in the order received;
   f. a second ordered register having an input and an output, said input adapted to receive said succession of data from the output of said known noise comparator and to store said data in the order received;

g. a possible signal and noise comparator having an input adapted to successively receive simultaneously the largest value stored in said first and second ordered registers, select the larger of the two values, output one of two signals indicative of the register in which said value is stored, then emptying said register of said larger value.

6. A system as described in claim 5 wherein said sensor system is a radar system.

7. A system as described in claim 5 wherein said sensor system is a sonar system.

8. A method for detecting signals in a variable environment including noise comprising the steps of:
  a. gathering one or more possible signal datum from a portion of the environment;
  b. gathering one or more datum representative of the presumed noise in said environment; then
  c. ranking said data in order of magnitude; then
  d. constructing a two-discrete-valued series corresponding to said magnitude ranking, wherein one of said discrete values indicating magnitude ranking comes from the possible signal population and the other of said discrete values indicating a magnitude ranking is from the known noise population, a one-to-one relationship existing between the magnitude ranking and the two-discrete-valued series; then
  e. constructing orthogonal subsets that completely represent the discrete-two-valued series; then
  f. associating with each of said subsets a weight, said weight selected in accordance with the particular signal plus noise distribution being tested; then
  g. multiplying each of said subsets by its associated weight function; then
  h. summing the products of the subsets and weight function; then
  i. comparing said sum of products with a pre-selected threshold value, said comparison indicating the presence or absence of signal.

9. A method as described in claim 8 wherein said orthogonal subsets are the set of Walsh functions corresponding to a discrete two-valued series of the length stored in said register.

10. A method as described in claim 9 wherein said weight multipliers are derived from the Van der Waerden score function.

11. A method as described in claim 9 wherein said weight multipliers are derived from the Fisher-Yates score function.

12. A method as described in claim 9 wherein said weight multipliers are derived from the Siegal-Tukey score function.

* * * * *